Jan. 5, 1932.        L. C. HARDESTY        1,840,093

METHOD OF AND APPARATUS FOR STARTING ALTERNATING CURRENT MOTORS

Filed July 15, 1926

Inventor:
Llewellyn C. Hardesty,
by
His Attorney.

Patented Jan. 5, 1932

1,840,093

UNITED STATES PATENT OFFICE

LLEWELLYN C. HARDESTY, OF SCOTIA, NEW YORK, ASSIGNOR TO GENERAL ELECTRIC COMPANY, A CORPORATION OF NEW YORK

METHOD OF AND APPARATUS FOR STARTING ALTERNATING CURRENT MOTORS

Application filed July 15, 1926. Serial No. 122,724.

My invention relates to the starting of alternating current motors, and more particularly to improvements in the Korndorfer method of starting such motors by means of an auto transformer, as is set forth in the U. S. patent to Max Korndorfer No. 1,096,922, dated May 19, 1914.

The method disclosed in the said Korndorfer patent is entirely operative and practical for the ordinary conditions encountered, but leaves something to be desired for certain special conditions. In the particular system disclosed by Korndorfer for the explanation of the broad principles of his invention, the difference of voltage between the tap voltage and the line voltage may be so large as to impose severe strains on the motor or cause an excessive current to be taken from the line when the transition from the auto-transformer tap connection to the full line voltage connection is made. If the tap voltage is increased, a greater rush of current from the line is occasioned when the motor is initially connected thereto.

In accordance with my invention, I cause the tap voltage to be varied to meet the conditions imposed and at the same time obtain the advantages of the Korndorfer system of utilizing the autotransformer as a reactive coil to avoid opening the motor circuit during the starting operation. In the form of my invention which I now regard as the preferred, the motor is permanently connected to the auto-transformer taps and the number of auto-transformer coils employed is increased step by step, one auto-transformer neutral point being first established, then this neutral point being opened and another established, the auto-transformer being used as a reactive coil in the intervals between steps.

Figure 1:
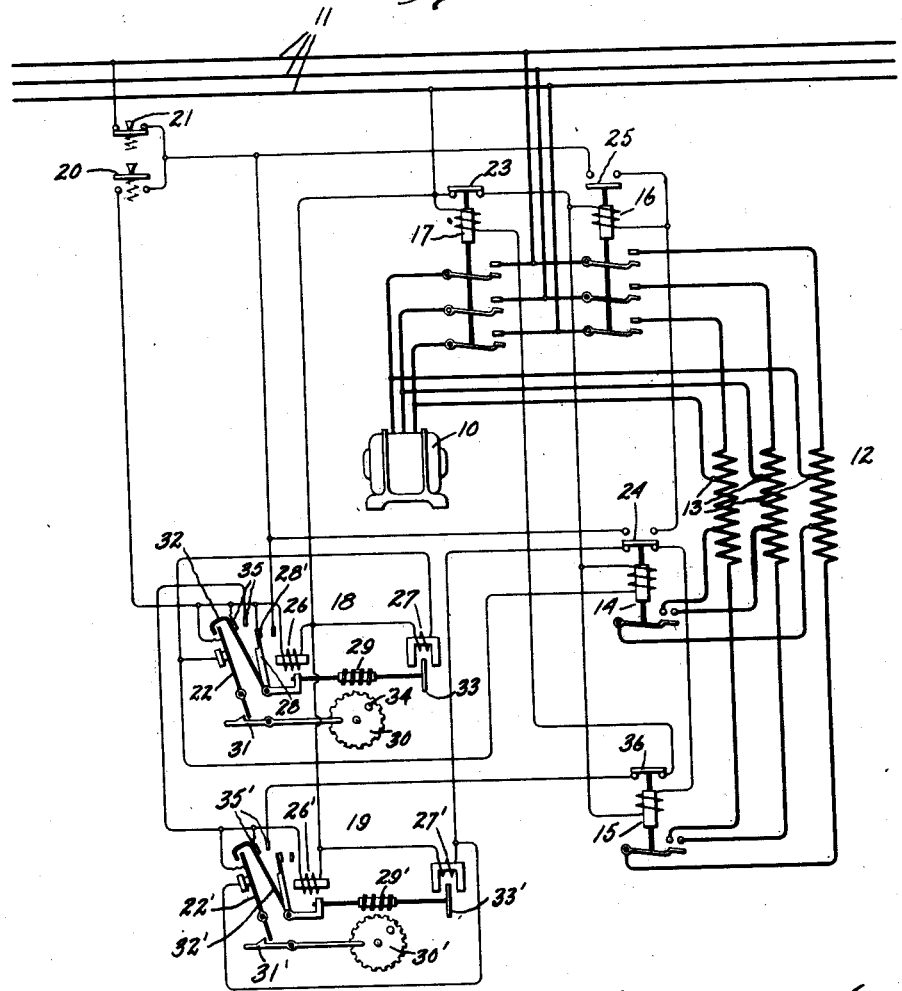
Figure 2:
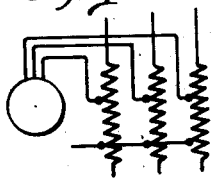
Figure 3:
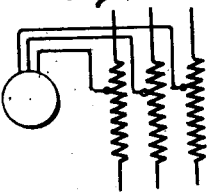
Figure 4:
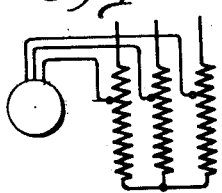
Figure 5:
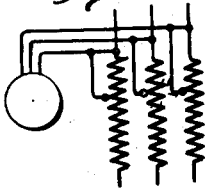

For a better understanding of the invention, reference is had to the accompanying drawings in which Fig. 1 shows a simplified system of control for an alternating current motor in accordance with the invention; and Figs. 2, 3, 4 and 5 show diagrammatically the connections for the various steps employed in starting the motor.

The motor 10 is supplied with power from the three-phase source of supply 11, and the voltage applied to the motor at starting is regulated by means of electromotive force regulating device 12 which serves part of the time as an auto-transformer and part of the time as a reactive coil. The motor is permanently connected to the taps 13 of the voltage reducing device 12. The electromagnetic switch 14 is provided for establishing one neutral point of the transformer and a similar electromagnetic switch 15 is provided for establishing another neutral point of the transformer in which a greater number of coils of the transformer are employed than is the case when the switch 14 is closed. The voltage regulating device 12 is connected to the source of supply by means of electromagnetic switch or contactor 16 and the motor is connected directly to the source of supply by means of the electromagnetic switch or contactor 17. The desired sequence of operation of the respective circuit controlling switches is obtained by means of the time element relays 18 and 19. Any desired form of automatically operating relays may be provided for controlling the successive operation of the various motor controlling switches. In order to explain the principles of the invention, I have indicated the relays 18 and 19 in a very simple diagrammatic manner and it will be understood that the preferred construction of these relays is as disclosed and claimed in the co-pending application of Hugh M. Stephenson, Serial No. 745,028, filed October 21, 1924. These relays operate as time element controlling devices for effecting the closing and opening of the various electromagnetic switches which control the starting of the motor.

In general, the method of starting the motor may be briefly stated to be as follows:— The neutral establishing contactor 14 is first energized to close and in closing establishes an energizing circuit for the electromagnetic switch or contactor 16. The motor will thus be connected to the source of supply through the device 12 serving as an auto-transformer with a neutral established so as to include only a portion of the transformer windings. After an interval of time determined by the relay 18, the contactor 14 will be opened and then the contactor 15 will be closed. The voltage reducing device 12 serves as a reactor coil during the transition between the opening of contactor 14 and the closing of contactor 15 so that the connection between the motor and the source is not interrupted. When the contactor 15 is closed, a greater number of the windings of the device 12 are now utilized and the contactor 15 establishes a neutral point so that the potential applied to the mtor will be increased. After an interval of time determined by the relay 19, the contactor 15 will open and the line contactor 17 will automatically close, thereby connecting the motor directly to the source of supply. When the line contactor 17 closes, the contactor 16 will be caused to automatically open and thereby disconnect the voltage reducing device 12 from the source of supply. The device 12 functions as a reactor coil during the interval between the opening of contactor 15 and the closing of contactor 17.

As thus constructed and arranged and with the parts in their respective positions indicated in the drawings, the operation of my invention is as follows:—In order to start the motor 10, the start push button 20 will be temporarily closed, thereby energizing the winding of the neutral establishing contactor 14 through a circuit which may be traced from the upper conductor of the three-phase source 11, the stop push button 21, contacts 22 of relay 18, winding of contactor 14 through the auxiliary switch 23 associated with line contactor 17 to the lower conductor of the three-phase source. This will cause the closing of contactor 14 and establish a neutral point for the windings of the voltage controlling device 12 which includes only a portion of the windings thereof. When the contactor 14 closes, the auxiliary switch 24, associated therewith makes engagement with its upper set of contacts and thus establishes a circuit for the winding of contactor 16. This circuit may be traced through the stop push button 21, upper auxiliary contacts of contactor 14, winding of contactor 16, auxiliary switch 23 to the lower conductor of the three-phase source. The contactor 16 will thus be energized to close and connect the voltage reducing device 12 to the source of supply, the voltage reducing device now serving as an auto-transformer interposed between the motor 10 and the source 11 as is shown in rudimentary form in Fig. 2. When the contactor 16 closes, it establishes a holding circuit for itself through its auxiliary switch 25, this circuit being independent of the auxiliary switch 24 associated with contactor 14.

The operating mechanism of the relay 18 is set in operation simultaneously with the energization of the neutral establishing contactor 14. Thus, when the start push button 20 is initially closed, the electromagnets 26 and 27 of relay 18 are energized. The electromagnet 26 is energized directly and the electromagnet 27 is energized through a circuit which includes the relay contacts 22. The energization of the electromagnet 26 will cause the armature 28 associated therewith to be attracted and the worm 29 to be brought into engagement with the worm wheel 30. Upon the attraction of the armature 28, the contacts 28' will be closed, and consequently the electromagnets 26 and 27 and the contactor 14 will be energized through a circuit which excludes the start push button 20 so that the start push button may be released after a momentary depression thereof. The switch contacts 22 of relay 18 will be mechanically held in their closed position by means of the catch 31, despite the tendency of the hooked switch arm 32 associated with the armature 28 to open these contacts when the electromagnet 26 is energized.

The electromagnet 27 and the disk 33 of non-magnetic material are intended to indicate diagrammatically an alternating current disk type motor. As the disk rotates, the worm wheel 30 will be caused to rotate by means of the worm 29 so that eventually the pin 34 will engage the right hand end of the pivoted catch 31 and move the left hand end of the catch out of engagement with the lower end of the switch lever carrying one of the contacts 22. The switch member 32 is preferably of resilient material and the intention is that this switch member shall be put under strain when the electromagnet 26 is energized. When the catch 31 is released, this strain is effective to open contacts 22 and close the contacts 35. The opening of contacts 22 effects the de-energization of the neutral establishing contactor 14 so that this contactor will open. The electromagnet 27 is also deenergized so that the worm wheel will not be further rotated. The contactor 16 will remain closed as previously explained and the voltage reducing device 12 now serves as a reactor interposed between the source 11 and the motor 10 as is clearly shown in Fig. 3 of the drawings. The connection between the source and the motor during the transition from one tap voltage to another tap voltage is thus effected without interrupting the motor circuit.

The closing of the relay contacts 35 will establish a circuit for the winding of the neutral establishing contactor 15. This circuit may be traced as follows:—From the upper conductor of the three-phase source, stop push button 21, contacts 28' of relay 18, contacts 35 of this relay, contacts 22' of relay 19, the lower contacts associated with auxiliary switch 24 of neutral establishing contactor 14, winding of contactor 15, auxiliary switch 23 to the lower conductor of the source of supply. A greater number of the coils of the transformer will now be utilized and the voltage applied to the motor 10 will then increase; this condition being illustrated diagrammatically in Fig. 4 of the drawings. The electromagnets 26' and 27' of relay 19 will be energized simultaneously with the contactor 15 in the same manner as the corresponding electromagnets of relay 18 were energized when the start push button 20 was originally depressed. The energization of electromagnet 26' will cause the worm 29' to be brought into engagement with the worm wheel 30', and the resilient switch 32' to be put under strain tending to close the contacts 35' and open contacts 22'. The disk 33', under the action of the electro-magnet 27', will rotate and thus effect the rotation of worm wheel 30' to trip the catch 31' after an interval of time. When the catch 31' is tripped, the contacts 22' are opened and the contacts 35' are closed. The opening of the contacts 22' will effect the de-energization of the neutral establishing contactor 15 thereby causing this contactor to open. The electromagnet 27' will also be deenergized and rotation of the worm wheel 30' will stop. Since the contactor 16 is maintained closed through a circuit independently of the contactor 15, the voltage reducing device 12 now serves as a reactor coil interposed between the source of supply and the motor so that the transition from the high tap voltage to the full line voltage is effected without opening the motor circuit. In this transition period the coils connected as reactors are the same as in the previous case as shown schematically in Fig. 3 of the drawings. When the contactor 15 opens, the auxiliary switch 36 associated therewith will close. This will establish a circuit for the winding of the line contactor 17 through a circuit which may be traced as follows:—From the stop push button 21, contacts 28' and 35 of relay 18, contacts 35' of relay 19, auxiliary switch contacts 36 through the winding of contactor 17 to the lower conductor of the three-phase source. The line contactor 17 will then close to short circuit the portions of the autotransformer windings between the motor taps 13 and the line terminals and thereby connect the motor directly to the source of supply as shown diagrammatically in Fig. 5. The winding of contactor 16 will be de-energized by the opening of auxiliary switch 23 associated with the line contactor 17 so that the voltage reducing device 12 is disconnected from the source of supply except as to the permanent connection between the motor and the taps 13 of the voltage reducing device 12. In order to stop the motor and restore the respective parts to their various positions indicated on the drawings, it is simply necessary to depress momentarily the stop push button 21.

What I claim as new and desire to secure by Letters Patent of the United States, is:

1. In combination in a control for effecting a variation in the potential applied to electrical apparatus from a substantially constant potential source of supply, an autotransformer provided with taps and arranged to be interposed between said source and said apparatus with the said apparatus connected to said taps, means including a control device and a plurality of electromagnetic switches controlled thereby for establishing different neutrals for the transformer windings, means including a time delay device operable in response to operation of said control device for effecting a definite sequence in the closing and opening of said switches, and connections whereby said transformer functions as an auto-transformer when any of said switches is closed and as a reactor when all of said switches are open.

2. A system for controlling the starting of alternating current motors comprising an autotransformer having a plurality of windings provided with terminals, a contactor for establishing a neutral for a portion of each of said windings, a second contactor for establishing a neutral for a greater portion of each of said windings, a third contactor for connecting the motor directly with the source, taps located intermediately of said terminals and both of said neutrals for connection with the motor, connections between said terminals and the supply source, a manually operable control device for closing said first contactor, means responsive to the operation of said contactor for establishing said connections so that a low voltage is applied to the motor, means comprising a time delay device responsive to the operation of said manually operated device for opening said first contactor and closing said second contactors while leaving the remaining connections unchanged so that a higher voltage is applied to the motor and a portion of each of said windings acts as an impedance in circuit with the motor in the interval between the operations of said contactors, means comprising a second time delay device responsive to operation of said first time delay device for opening said second contactor and closing said third contactor while leaving the remaining connections unchanged so that line voltage is applied to the motor and said windings serve as impedances between the operations of said second and third contactors and means responsive to the driving operation of said third contactor for opening said connections to disconnect said terminals from the source.

In witness whereof, I have hereunto set my hand, this 14th day of July, 1926.

LLEWELLYN C. HARDESTY.